United States Patent
Peters et al.

(10) Patent No.: US 11,940,351 B2
(45) Date of Patent: Mar. 26, 2024

(54) BORESCOPE THAT PROCESSES IMAGE DATA INTO 3-D DATA FOR OPTICALLY INSPECTING GAS TURBINES

(71) Applicant: Lufthansa Technik AG, Hamburg (DE)

(72) Inventors: Jan Oke Peters, Hamburg (DE); Michael Thies, Hamburg (DE); Sven Rasche, Hamburg (DE); Tomas Domaschke, Hamburg (DE); Thorsten Schueppstuhl, Hamburg (DE); Werner Neddermeyer, Echternach (LU); Soenke Bahr, Darmstadt (DE)

(73) Assignee: LUFTHANSA TECHNIK AG, Hamburg (DE)

(*) Notice: Subject to any disclaimer, the term of this patent is extended or adjusted under 35 U.S.C. 154(b) by 224 days.

(21) Appl. No.: 17/422,210

(22) PCT Filed: Jan. 14, 2020

(86) PCT No.: PCT/EP2020/000008
§ 371 (c)(1),
(2) Date: Jul. 12, 2021

(87) PCT Pub. No.: WO2020/148084
PCT Pub. Date: Jul. 23, 2020

(65) Prior Publication Data
US 2022/0082473 A1 Mar. 17, 2022

(30) Foreign Application Priority Data
Jan. 14, 2019 (DE) .................... 10 2019 100 821.2

(51) Int. Cl.
*G01M 15/14* (2006.01)
*F01D 21/00* (2006.01)
(Continued)

(52) U.S. Cl.
CPC .......... *G01M 15/14* (2013.01); *F01D 21/003* (2013.01); *G01N 21/954* (2013.01);
(Continued)

(58) Field of Classification Search
CPC .. G01M 15/14; G01M 11/081; G01N 21/954; F05D 2220/323; F05D 2260/83; G02B 23/2484
See application file for complete search history.

(56) References Cited

U.S. PATENT DOCUMENTS 9,220,399 B2  12/2015  Cinquin et al.
2004/0183900 A1  9/2004  Karpen et al.
(Continued)

FOREIGN PATENT DOCUMENTS

CN  107490549 A  12/2017
CN  107851176 A  3/2018
(Continued)

OTHER PUBLICATIONS

Tushara, D. Bindu, PA Harsha Vardhini, and J. V. Rao. "Image Compression on FPGA and Transfer Using ZIGBEE/I2C Protocol.", 2015 (Year: 2015).*

*Primary Examiner* — Eric S. McCall
*Assistant Examiner* — Timothy P Graves
(74) *Attorney, Agent, or Firm* — LEYDIG, VOIT & MAYER, LTD.

(57) ABSTRACT

A borescope is for optically inspecting gas turbines of aircraft engines. The borescope having an electronic image capture unit as a borescope objective at an end of a shaft, which is suitable for insertion into a borescope opening and configured for accurate positioning of the borescope objective relative to the borescope opening and through which data lines and supply lines for the image capture unit are guided. The image capture unit has: two spaced apart image
(Continued)

capture sensors, recording cones of which overlap in a specified recording plane forming a recording region, in such a way that image data of the two image capture sensors are configured to be processed into 3-D data by way of triangulation.

13 Claims, 5 Drawing Sheets

(51) Int. Cl.
*G01N 21/954* (2006.01)
*G02B 23/24* (2006.01)

(52) U.S. Cl.
CPC .... *G02B 23/2492* (2013.01); *F05D 2220/323* (2013.01); *F05D 2260/80* (2013.01); *F05D 2260/83* (2013.01); *G01N 2021/9544* (2013.01)

(56) References Cited

U.S. PATENT DOCUMENTS

| | | | |
|---|---|---|---|
| 2007/0132840 A1* | 6/2007 | Konomura | G02B 23/2484 348/E7.087 |
| 2009/0259102 A1 | 10/2009 | Koninckx et al. | |
| 2014/0139831 A1 | 5/2014 | Gutschow et al. | |
| 2014/0207406 A1 | 7/2014 | Domke et al. | |
| 2014/0357951 A1 | 12/2014 | Muller et al. | |
| 2015/0049167 A1 | 2/2015 | Suzuki et al. | |
| 2015/0062299 A1* | 3/2015 | Brown | H04N 13/239 348/45 |
| 2015/0338353 A1 | 11/2015 | Bancalari et al. | |
| 2017/0359529 A1 | 12/2017 | Motzer et al. | |
| 2018/0270465 A1 | 9/2018 | Bendall | |
| 2018/0317752 A1* | 11/2018 | Cybulski | A61B 1/3135 |
| 2018/0341101 A1 | 11/2018 | Heni et al. | |
| 2020/0260066 A1 | 8/2020 | Liu | |

FOREIGN PATENT DOCUMENTS

| | | |
|---|---|---|
| DE | 102007008756 A1 | 8/2008 |
| DE | 102011114541 A1 | 4/2013 |
| DE | 202013004379 U1 | 5/2013 |
| DE | 102016113000 A1 | 1/2018 |
| DE | 102017218426 B3 | 1/2019 |
| GB | 2554794 A | 4/2018 |
| JP | H 05303032 A | 11/1993 |
| JP | 2002336188 A | 11/2002 |
| JP | 2013218252 A | 10/2013 |

* cited by examiner

BORESCOPE THAT PROCESSES IMAGE DATA INTO 3-D DATA FOR OPTICALLY INSPECTING GAS TURBINES

CROSS REFERENCE TO RELATED APPLICATIONS

This application is a U.S. National Phase application under 35 U.S.C. § 371 of International Application No. PCT/EP2020/000008, filed on Jan. 14, 2020, and claims benefit to German Patent Application No. DE 10 2019 100 821.2, filed on Jan. 14, 2019. The International Application was published in German on Jul. 23, 2020 as WO 2020/148084 A1 under PCT Article 21(2).

FIELD

The invention relates to a borescope for optically inspecting gas turbines, in particular aircraft engines.

BACKGROUND

In the optical inspection of gas turbines, in particular aircraft engines such as jet engines, a borescope can be inserted through a lateral opening into a fully assembled gas turbine in order then to be able to optically inspect the interior of the gas turbine therewith.

On account of the loads acting during the operation, borescopy in particular is used for the inspection of turbine and compressor blades of aircraft engines. A borescope may be laterally inserted into the aircraft engine in the process, and positioned in the interior of the gas channel in such a way that a blade of a turbine or compressor stage and the connection region of the engine blade—a given height range of the blade surface in the case of relatively large engine blades—are located completely within the image region of the borescope. The turbine or compressor stage is then rotated in order thus to be able to dynamically capture all engine blades of the corresponding stage.

The video recordings generated are analyzed manually in order to document the build state of the engine blades. A manual static 3-D capture of an individual engine blade can be implemented in the case of significant damage in order to analyze the damage in even greater detail. However, this 3-D capture is very complicated and time-consuming, and so it is only carried out in exceptional cases.

SUMMARY

In an embodiment, the present disclosure provides a borescope is for optically inspecting gas turbines of aircraft engines. The borescope having an electronic image capture unit as a borescope objective at an end of a shaft, which is suitable for insertion into a borescope opening and configured for accurate positioning of the borescope objective relative to the borescope opening and through which data lines and supply lines for the image capture unit are guided. The image capture unit has: two spaced apart image capture sensors, recording cones of which overlap in a specified recording plane forming a recording region, in such a way that image data of the two image capture sensors are configured to be processed into 3-D data by way of triangulation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
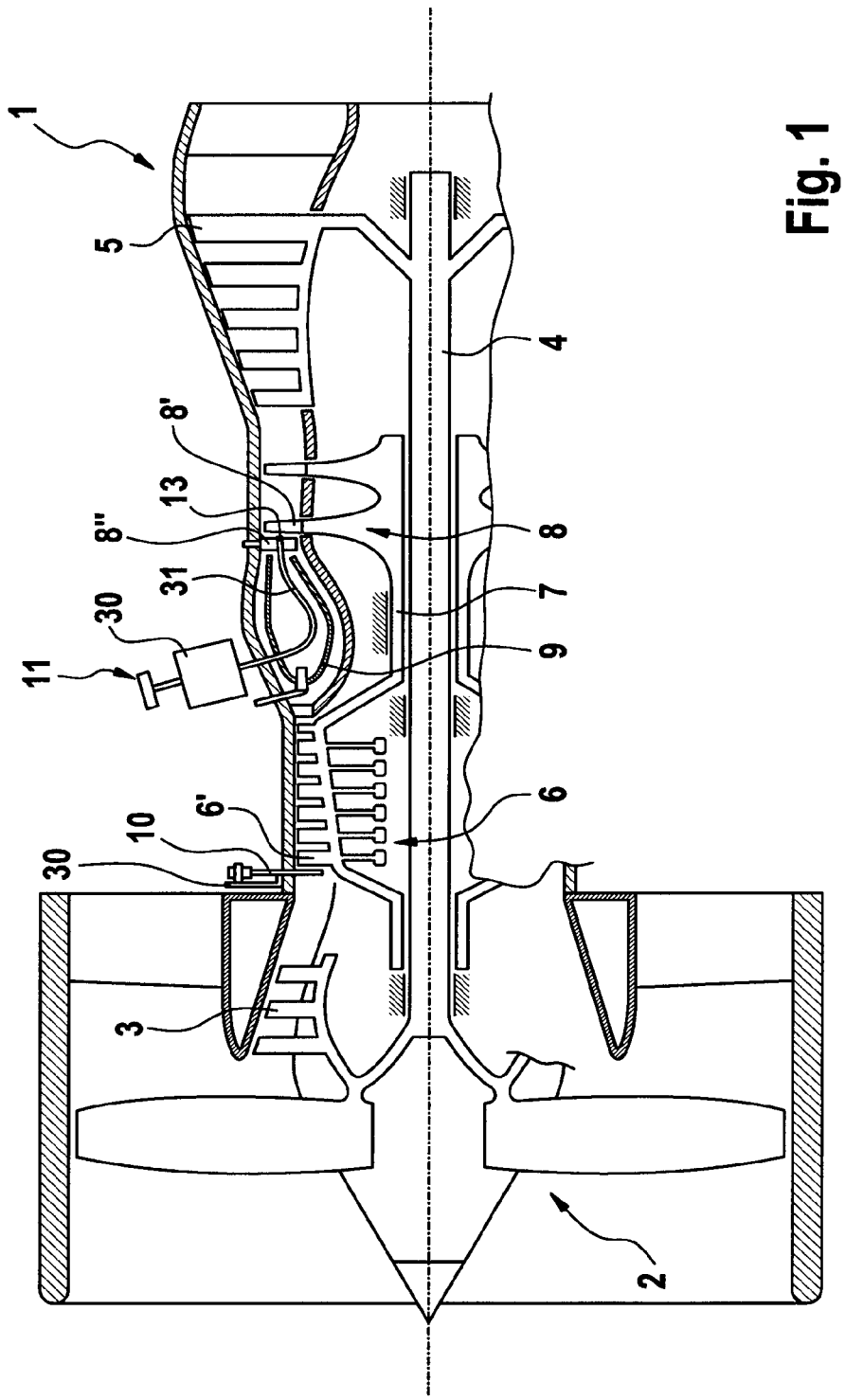
FIG. 1 shows a schematic sectional view of an aircraft engine with two borescopes according to the invention.

Embodiments of the present invention provide a borescope that facilitates an improved 3-D capture of the interior of a gas turbine.

Accordingly, embodiments of the present invention provide a borescope for optically inspecting gas turbines, in particular aircraft engines, comprising an electronic image capture unit as borescope objective at the end of a shaft, which is suitable for insertion into a borescope opening and for accurate positioning of the borescope objective relative to the borescope opening and through which data and supply lines for the image capture unit are guided, wherein the image capture unit has two spaced apart image capture sensors, the recording cones of which overlap in a specified recording plane for the purposes of forming a recording region, in such a way that the image data of the two image capture sensors are able to be processed into 3-D data by way of triangulation.

The borescope according to the invention is based on the principle of the so-called videoscope, in which the images recorded by an optical unit at the free end of the borescope are not guided by an optical line to an eyepiece or camera at the other end of the borescope but are immediately converted at the free end into electronic image information, which is then transmitted via a data line to a display or computer, for example, for further processing.

According to the invention, the image capture unit comprises two spaced apart image capture sensors, which are not for example aligned parallel to one another for the purposes of increasing the image section of the borescope able to be captured, but whose recording cones overlap in a recording plane such that a recording region captured by both recording cones arises in the recording plane. On account of the spacing of the two image capture sensors and the deviating viewing angles onto the recording region arising therefrom, it is possible with the aid of triangulation to ascertain the distance from the image capture unit as 3-D data for practically every point in the recording region. Methods suitable to this end are known by the term stereovision. A 3-D model of the object or image region recorded by the borescope can be generated from the image information together with the 3-D data.

Very large amounts of data are generated by the two image capture sensors, particularly in the case of the advantageous dynamic capture by the borescope according to the invention, the direct transmission of said data to a display or an external computer necessitating a large number of high-performance data lines, in turn leading to a large shaft diameter. Therefore, it is preferable for the image capture unit to comprise an integrated circuit for the preprocessing of the data generated by the image capture sensors in order to thus reduce the data to be transported by the data lines. By way of example, the data reduction can be achieved by compressing the raw data originating from the image sensors. It is additionally or alternatively also possible for the integrated circuit, for example a "field programmable gate array" (FPGA), to remove the data from the raw data which do not image the ultimate recording region of the image capture system captured by both sensors.

However, it is particularly preferable for the integrated circuit to already ascertain the image information recorded simultaneously by the two image capture sensors as 3-D data with the aid of triangulation. Then, it is only necessary to transmit a single image complemented by 3-D data over the data lines instead of two images, which significantly reduces the data transfer. The one image to be transmitted can be the image captured by one of the two image capture sensors or an image combined from the data of the two image capture sensors. The image can be transmitted separately from the 3-D data or together with the latter by already having been processed by the integrated circuit to form a 3-D model.

The image capture sensors can be arranged and/or configured in such a way that the recording cones of the two image capture sensors are arranged at a specified viewing angle in relation to the longitudinal axis of the image capture unit. Regions to the side of the image capture unit can be captured if this viewing angle is 90°. A different choice of the viewing angle deviating from 90° allows regions up ahead (angular range 30°-90°) or regions behind (angular range 90°-150°) in relation to the insertion direction of the borescope to be captured. This is particularly relevant for regions that cannot be viewed by a borescope with lateral capture, for example frequently the blade root and/or the blade tips.

It is possible to provide a plurality of borescopes with different viewing angles, which are used successively in a gas turbine according to requirements in order to capture all desired regions. However, it is also possible to provide a plurality of pairs of image capture sensors on a single borescope, said pairs each having different viewing angles. In particular, two pairs of image capture sensors can be provided, wherein the recording cones of the two image capture sensors of the one pair are aligned at a different viewing angle in relation to the longitudinal axis of the image capture unit to the recording cones of the two image capture sensors of the other pair.

It is preferable for the image capture sensors to be arranged with a center spacing of 2 mm to 20 mm, preferably of 5 mm to 15 mm, further preferably of 8 mm to 11 mm. The "center spacing" denotes the distance of the two sensor centers from one another. The accuracy of the ascertainment of the 3-D data with the aid of triangulation depends on the distance between the two image capture sensors, with the limited available installation space and optical distortions on account of the regularly only small distance of the recording plane from the image capture unit being limiting factors. The aforementioned distances were found to be advantageous, particularly for the use of the borescope according to the invention for inspecting gas turbines. In particular, it is also possible to provide more than two image capture sensors, for example three image capture sensors, only the image data of two of the plurality of image capture sensors or three image capture sensors respectively being used to ascertain the 3-D data with the aid of triangulation. In the case of a suitable arrangement of the plurality of image capture sensors or three image capture sensors, it is possible by choosing the two image capture sensors ultimately used to vary their distance from one another and thus adjust the latter to the respective recording situation.

The image capture sensors can be embodied for the direct capture of color information. If there is not sufficient installation space available for corresponding color image sensors, it is also possible for the image capture sensors to only be embodied to determine grayscale values. As a rule, corresponding black/white image sensors are smaller than color image sensors. If the two image capture sensors are only embodied to determine grayscale values, provision can be made of an additional color sensor, the information of which being able to be merged with the grayscale values of the image capture sensors to form a color image. Since the color sensor for example need not necessarily have the same resolution as the image capture sensors, the color sensor can be configured to be sufficiently small for the installation space available.

The image capture sensors are preferably CCD sensors or CMOS sensors, preferably with global shutters. The image capture sensors preferably have a resolution of at least 400×400 pixels (for example, up to 2400×2400 pixels), a frame rate of up to 240 frames per second and/or a field angle of 35° to 65°, 90° or 120°, preferably of 40°, 50° or 60°, in each case ±5°, preferably in each case ±3°. Corresponding image capture sensors in particular also facilitate the continuous recording of image information, allowing a dynamic capture of components of a gas turbine, for example engine blades, which dynamic capture arises by rotating one or more shafts of the gas turbine, for example.

It is preferable for the image capture unit to comprise at least one LED for illuminating the recording region. By arranging the LED directly as part of the image capture unit, it is possible to ensure good illumination and lighting of the recording region. The at least one LED can emit visible light and/or infrared radiation, depending on the wavelength range for which the image capture sensors are designed. Naturally, it is also possible to provide a plurality of different LEDs—for example, one for the visible range and one for the infrared range.

The shaft of the borescope can be rigid or flexible. The borescope can be guided through a guide tube if the shaft is flexible. In this case, the guide tube can be part of the borescope or part of a separate guiding apparatus. By way of the guide tube, it is then possible to define the basic position of the borescope or its image capture unit, with a fine adjustment of the position and alignment of the image capture unit being able to be achieved by displacing and rotating the shaft in relation to the guide tube. In the case of a rigid borescope, the position and alignment of the image capture unit within the interior of a gas turbine can be read in comparable fashion at the part of the borescope protruding from the gas turbine.

The borescope according to the invention is suitable for the dynamic capture of engine blades of a gas turbine, in particular of an aircraft engine. Particularly in combination with a (semi-)automatic guide of the borescope, as is described in, e.g., DE 10 2017 218 426.4, the entirety of which is referred to herewith, the borescope according to the invention can be used for the automatic 3-D capture of engine blades, in which the borescope is guided along a rotating engine stage in controlled fashion and captures the engine blades in three dimensions in the process.

FIG. 1 schematically shows a section through a two-spool engine 1, in which the fan 2 and the low-pressure compressor 3 are connected so as to co-rotate with the low-pressure turbine 5 by way of a first shaft 4 while the high-pressure compressor 6 is connected so as to co-rotate with the high-pressure turbine 8 by way of a second shaft 7. The combustion chamber 9 is arranged between high-pressure compressor 6 and high-pressure turbine 8.

A first borescope 10 has been inserted into the engine 1 for the purposes of inspecting the compressor blades 6' of the high-pressure compressor. The turbine blades 8' of the high-pressure turbine 8 can be inspected by way of a second borescope 11 that has been inserted into the engine 1.

The first borescope 10 is a rigid borescope 10, which is guided by a guiding apparatus 30. Here, the guiding apparatus 30 is configured for an electronically controlled insertion of the borescope 10 into the engine 1. Expressed differently, the extent to which the borescope 10 should be inserted into the engine 1 can be specified for the guide apparatus 30 by way of a control unit that is not illustrated here; the guide apparatus 30 then implements this accordingly.

Figure 2:
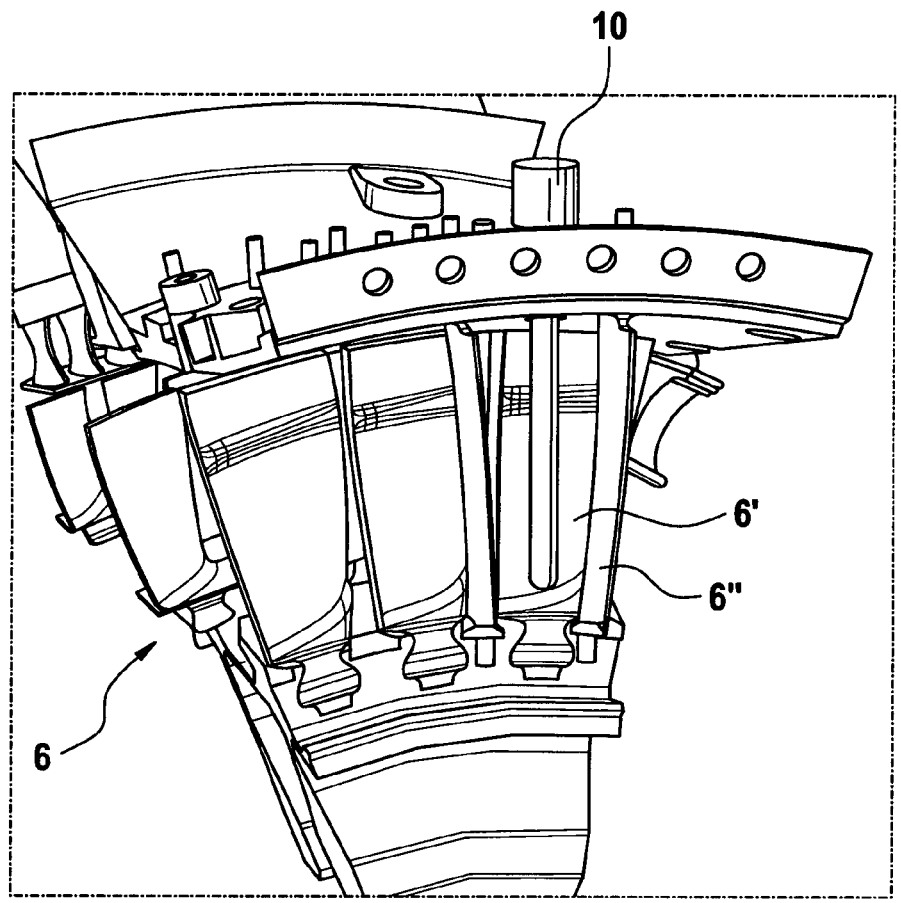
FIG. 2 shows a schematic partial view of the aircraft engine of FIG. 1 with the first borescope according to the invention.

FIG. 2 illustrates the region of the engine 1 into which the first borescope 10 has been inserted in more detail. The illustration of the guide apparatus 30 has been dispensed with so as to be able to clearly identify the borescope 10.

The rigid borescope 10 is introduced into the engine 1 through a borescope opening between two vanes 6" of the high-pressure compressor 6 and aligned in such a way that the blades 6' of the first stage of the high-pressure compressor 6 can be observed using the borescope 10. By rotating the second shaft 7 (cf. FIG. 1), the blades 6' can be guided past the borescope 10 so that all blades 6' of the first stage of the high-pressure compressor 6 can be inspected.

Figure 3:
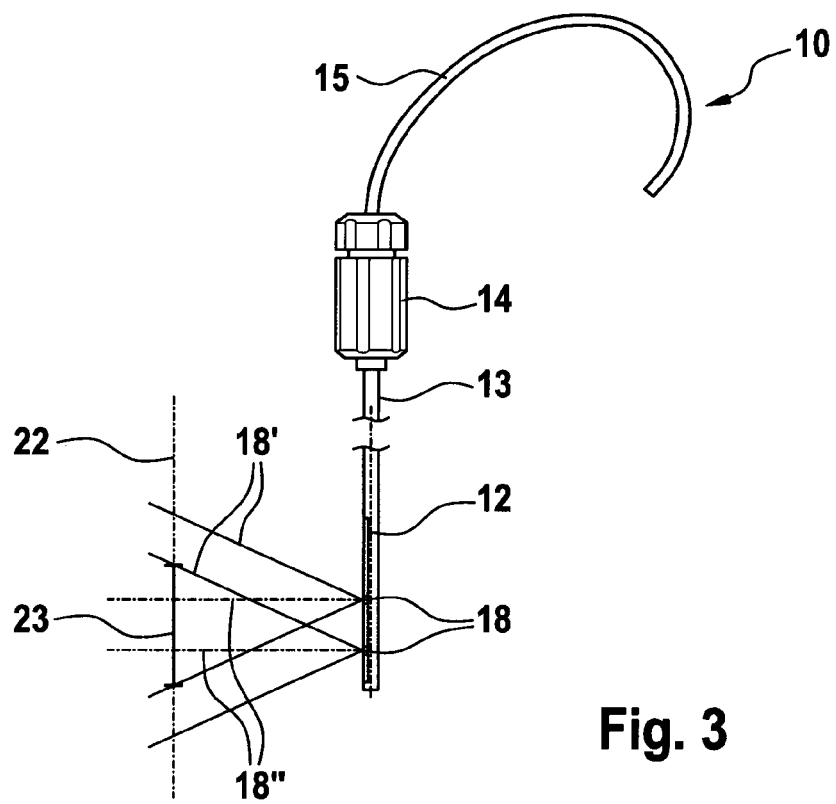
FIG. 3 shows a detailed view of the first borescope according to the invention of FIGS. 1 and 2 following insertion into the aircraft engine.

The first borescope 10 of FIGS. 1 and 2 is shown in FIG. 3.

The borescope 10 comprises an electronic image capture unit 12 as borescope objective at one end of the shaft 13 which is provided for insertion into a borescope opening, which has a rigid embodiment in the first borescope 10 and which has a lateral opening in the region of the image capture unit 12. A handle 14, which is also suitably embodied for connection to a guide apparatus 30 (cf. FIG. 1), is provided at the other end of the shaft 13. Data and supply lines 15 for the image capture unit 12 are guided through the shaft 13. The shaft has an external diameter of 7.6 mm.

Figure 4A:
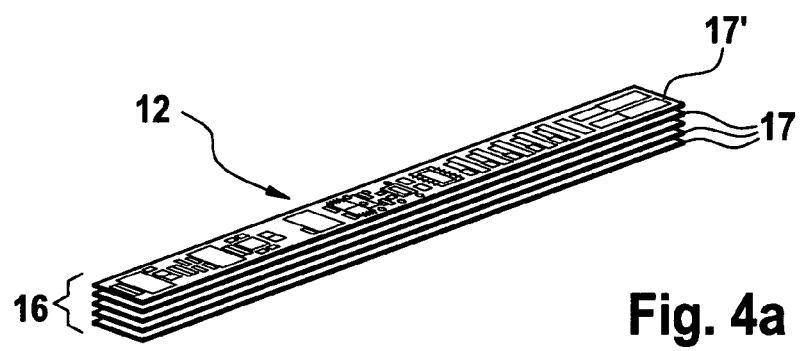
FIG. 4a and FIG. 4b show detailed views of the image capture unit of the borescope of FIG. 3.
Figure 4B:
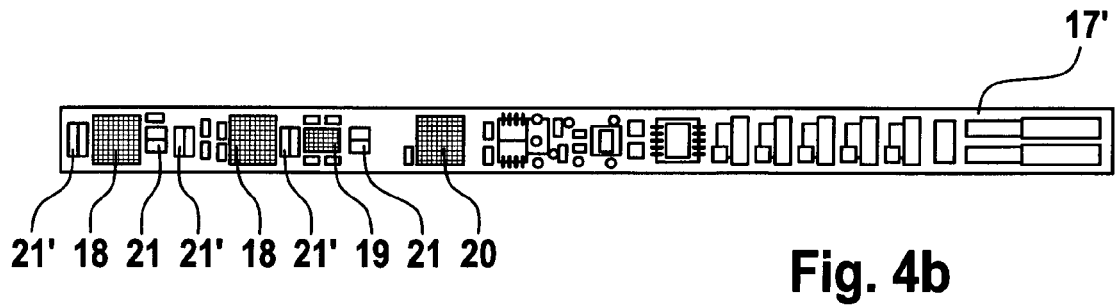

So that the image capture unit 12 can be received in full in the shaft 13, it comprises—as illustrated in FIG. 4a—a package 16 made of a plurality of printed circuit boards 17, 17' that are arranged above one another and connected to one another. The top side of the uppermost printed circuit board 17' facing the opening in the shaft 13 is illustrated in FIG. 4b.

Two image capture sensors 18 are arranged 10 mm apart on the printed circuit board 17'. Here, the image capture sensors 18 are CMOS sensors with a global shutter which—on account of the required small installation size—can only capture grayscale values. An additional color sensor 19 is provided in order nevertheless to be able to capture color information. The image capture sensors 18 have a resolution of 400×400 pixels and a frame rate of up to 240 frames per second. A lower resolution is frequently sufficient for the color sensor 19. However, it is possible in particular to dispense with a global shutter for the color sensor 19 and instead use a rolling shutter, as a result of which the installation size of the color sensor 19 can be significantly reduced when embodied as a CMOS sensor.

The two image capture sensors 18 and the color sensor 19 are configured such that they cover the same recording region 23 in principle. In this case, the recording region 23—as still explained in more detail on the basis of FIG. 5—can be freely defined in broad regions by way of a suitable configuration of the recording cones of the sensors 18, 19. To this end, provision can be made of lenses that are directly adhesively bonded to the sensors 18, 19.

Independently of the use of lenses and the configuration thereof, the recording cones 18' of the two image capture sensors 18 (or their respective axes 18") extend substantially parallel to one another. As a result, it is possible with comparatively little outlay to ascertain 3-D data from the image data of the two image capture sensors 18 by way of known stereo vision methods with the aid of triangulation, said 3-D data reflecting the distance of the individual pixels from the image capture unit 12. Ascertaining these 3-D data is implemented directly in the image capture unit 12 by the integrated circuit 20—an FPGA—provided there and combined thereby with the image data of one of the two image capture sensors 18 and the color information of the color sensor 19 to form a colored 3-D model of the recording region. Only this 3-D model is transmitted via the data line 15 to a display or to a computer which processes the data further or stores the latter. The raw data of the various sensors 18, 19 are discarded. Alternatively, it is naturally also possible to transmit the raw data via the data line 15.

Furthermore, LEDs 21 emitting visible light and infrared LEDs 21' for illuminating the recording region are provided on the image capture unit 12. These LEDs can also be provided with suitable lenses adhesively bonded thereon where necessary in order to be able to illuminate the recording region uniformly.

Figure 5A:
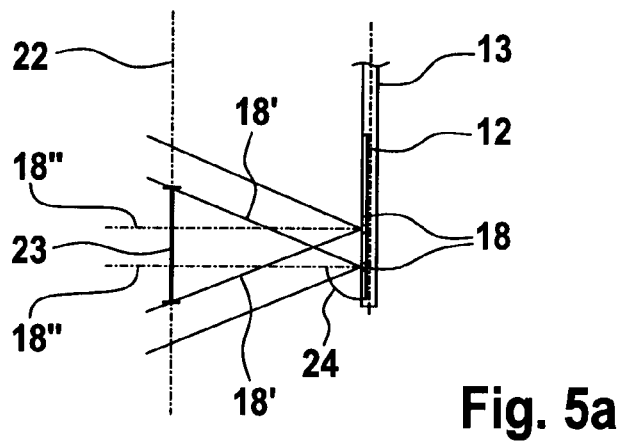
FIG. 5a, FIG. 5b, and FIG. 5c show schematic illustrations of various embodiment variants of the borescope of FIG. 3.
Figure 5B:
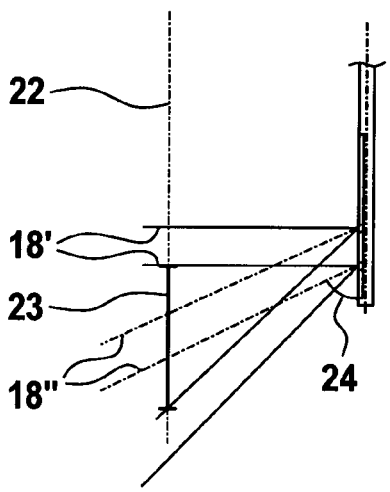
Figure 5C:
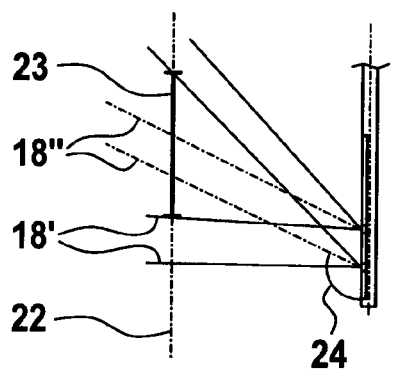

FIGS. 5a-c sketch out various embodiment variants of the borescope 10 of FIG. 3. Here, the embodiment variants have in principle an identical structure of the borescope 10 and only differ from one another in terms of the lenses adhesively bonded onto the image capture sensors 18. The illustration in FIGS. 5a-c is therefore restricted to the region of the borescope 10 in which the image capture unit 12 is arranged.

The axes 18" of the recording cones 18' of the two image capture sensors 18 in the embodiment variant as per FIG. 5a are each arranged approximately at right angles to the axis of the shaft 13 or of the image capture unit 12. The recording region 23 emerges as the region captured by the two image capture sensors 18 in a recording plane 22 which is arranged at a typical distance of the borescope 10 from the objects to be recorded, for example the blades 6' (see FIGS. 1 and 2).

The lenses are chosen on the image capture sensors 18 in such a way in FIG. 5b that the axes 18" of the recording cones 18' of the two image capture sensors 18 still extend parallel to one another but have a viewing angle of approximately 65° in relation to the axis of the shaft 13 when considered in the insertion direction of the borescope 10. As a result, it is possible to inspect regions located in front of the borescope 10 in the insertion direction, for example the blade roots of the blades 6' as illustrated in FIGS. 1 and 2.

In comparable fashion, the lenses on the image capture sensors 18 are chosen in such a way in the embodiment variant in FIG. 5c that the axes 18" of the recording cones 18' of the two image capture sensors 18 each extend at a viewing angle of approximately 115° in relation to the axis of the shaft 13 when considered in the insertion direction of the borescope 10. As a consequence, the recording region 23 is displaced rearward against the insertion direction and can thus simplify the inspection of the tip of the blades 6' (cf. FIGS. 1 and 2) for example. The recording cones 18' or their axes 18" continue to extend in parallel in order thus to facilitate a simple stereovision calculation or triangulation.

The second borescope 11 in FIG. 1 is now described in more detail. In this case, the borescope 11 and the guide apparatus 30 provided therefor are basically embodied as per DE 10 2017 218 426.4, to which reference is made in relation to a detailed explanation. It serves to inspect the turbine blades 8' of the first stage of the high-pressure turbine 8.

The borescope 11 is configured as a flexible borescope 11, i.e., the shaft 13 is completely flexible and pliable. The guide apparatus 30 has a suitably bent guide tube 31 through which the borescope 11 can be pushed in order to guide the borescope 11 through the combustion chamber 9 to the turbine blades 8' in question. The free end of the guide tube 31 can be moved and positioned accurately by way of the guide apparatus 30, for example using a computer-controlled drive, as a result of which it is also possible to accurately position a borescope 11 guided therein. The insertion depth of the borescope 11 in the guide tube 31 can also be altered to finely adjust the position of the borescope 11.

Figure 6:
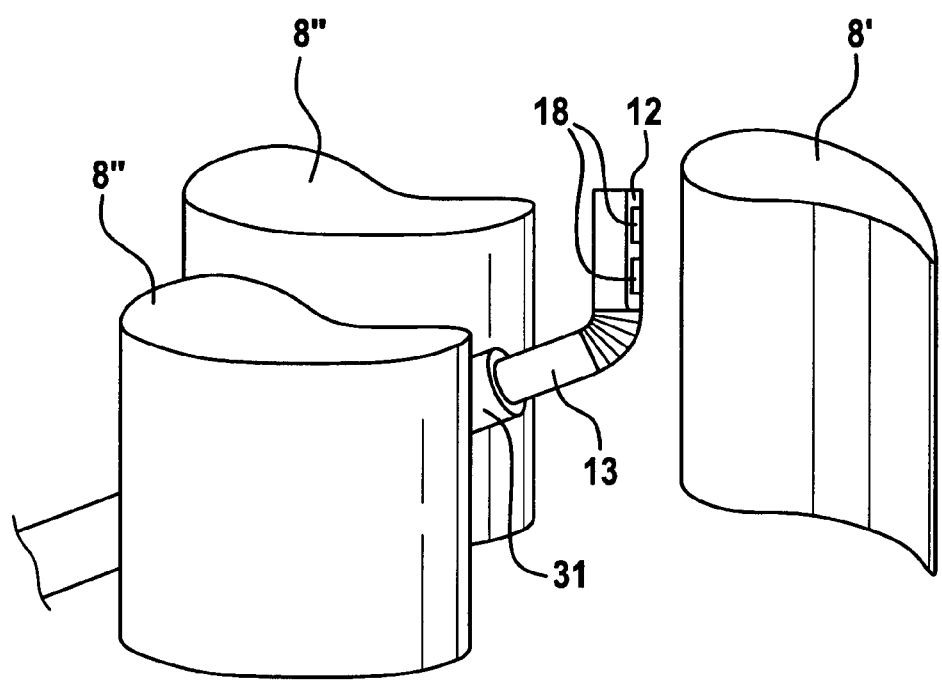
FIG. 6 shows a schematic partial view of the second borescope as per FIG. 1 following insertion into the aircraft engine.

FIG. 6 illustrates the free end of the guide tube 31 inserted into the engine 1 in more detail. The guide tube 31 is guided through the vanes of the high-pressure turbine 8. The borescope 11 protrudes from the guide tube 31.

The flexible shaft 13 of the borescope 11 which is pushed through the guide tube 31 is elastically kinked in such a way at its insertion end that the region of the shaft 13 with the image capture unit 12 is angled in the use state, as illustrated, but aligns coaxially with the guide tube 31 when the shaft 13 is retracted through the guide tube 31.

The image capture unit 12 comprises two image capture sensors 18 for recording images suitable for triangulation. Here, the image capture unit 12 can have a comparable embodiment to the image capture unit 12 of the first borescope 10, which is why reference is made to the statements given above in relation to a more in-depth explanation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A borescope for optically inspecting gas turbines of aircraft engines, the borescope comprising:
   an electronic image capture unit as a borescope objective at an end of a shaft, which is suitable for insertion into a borescope opening and configured for accurate positioning of the borescope objective relative to the borescope opening and through which data lines and supply lines for the image capture unit are guided,
   wherein the image capture unit comprises:
      two spaced apart image capture sensors, recording cones of which overlap in a specified recording plane forming a recording region, in such a way that image data of the two image capture sensors are configured to be processed into 3-D data by way of triangulations, and
      an integrated circuit configured to preprocess the data generated by the two spaced apart image capture sensors in order to reduce the data to be transported via the data lines, and
   wherein the integrated circuit is configured to process image data recorded simultaneously by the two spaced apart image capture sensors to form the 3-D data with the aid of triangulation.

2. The borescope as claimed in claim 1, wherein the two spaced apart image capture sensors are configured in such a way that the recording cones of both of the two spaced apart image capture sensors are aligned at a specified viewing angle in relation to a longitudinal axis of the image capture unit.

3. The borescope as claimed in claim 2, the borescope comprising two pairs of image capture sensors comprising recording cones,
   wherein the two pairs of image capture sensors comprise the two spaced apart image capture sensors,
   wherein the recording cones of the two pairs of image capture sensors comprise the recording cones of the two spaced apart image capture sensors,
   wherein the recording cones of both image capture sensors of one of the two pairs of image capture sensors are aligned at a different viewing angle in relation to the longitudinal axis of the image capture unit to the recording cones of the image capture sensors of another of the two pairs of image capture sensors.

4. The borescope as claimed in claim 1, wherein the two spaced apart image capture sensors are arranged with a center spacing of 2 mm to 20 mm.

5. The borescope as claimed in claim 1, wherein the two spaced apart image capture sensors are configured to directly capture color information, or
   wherein the two spaced apart image capture sensors are configured for grayscale value determination, with an additional color sensor being provided, the information of which being able to be merged with grayscale values of the two spaced apart image capture sensors to form a color image.

6. The borescope as claimed in claim 1, wherein the two spaced apart image capture sensors are CCD sensors or CMOS sensors.

7. The borescope as claimed in claim 6,
wherein the CCD sensors or the CMOS sensors have a resolution of at least 400×400 pixels, a refresh rate of up to 240 frames per second, or a field angle of 35° to 65°±5°.

8. The borescope as claimed in claim 1,
wherein the image capture unit comprises at least one LED for illuminating the recording region, wherein the at least one LED is configured to emit visible light or infrared radiation.

9. The borescope as claimed in claim 1,
wherein the shaft is rigid or flexible.

10. The borescope as claimed in claim 1,
wherein the two spaced apart image capture sensors are arranged with a center spacing of 5 mm to 15 mm.

11. The borescope as claimed in claim 1,
wherein the two spaced apart image capture sensors are arranged with a center spacing of 8 mm to 11 mm.

12. The borescope as claimed in claim 1, wherein the integrated circuit is arranged in the shaft of the borescope and upstream of the data lines in a data transmission direction, the data transmission direction beginning from the image capture sensors and passing toward a display.

13. The borescope as claimed in claim 1, wherein the integrated circuit is configured to be inserted into the borescope opening together with the image capture sensors.

\* \* \* \* \*

UNITED STATES PATENT AND TRADEMARK OFFICE
CERTIFICATE OF CORRECTION

PATENT NO. : 11,940,351 B2
APPLICATION NO. : 17/422210
DATED : March 26, 2024
INVENTOR(S) : Jan Oke Peters et al.

Page 1 of 1

It is certified that error appears in the above-identified patent and that said Letters Patent is hereby corrected as shown below:

In the Claims

In Claim 1, Lines 14-15, the phrase "...by way of triangulations,..." should read "... by way of triangulation,...".

Signed and Sealed this
Twenty-seventh Day of August, 2024

Katherine Kelly Vidal
*Director of the United States Patent and Trademark Office*